United States Patent [19]
Bunish et al.

[11] 3,794,752
[45] Feb. 26, 1974

[54] HIGH VOLTAGE CABLE SYSTEM FREE FROM METALLIC SHIELDING
[75] Inventors: Steve Bunish; Carl C. Landinger, both of New York, N.Y.
[73] Assignee: The Anaconda Company, New York, N.Y.
[22] Filed: May 30, 1973
[21] Appl. No.: 365,345

[52] U.S. Cl. ............... 174/115, 174/36, 174/41, 174/70 A
[51] Int. Cl. .................................. H01b 9/02
[58] Field of Search .......... 174/36, 102 SC, 105 SC, 174/106 SC, 120 SC, 41, 20 A, 113 R, 115

[56] References Cited
UNITED STATES PATENTS
3,684,821  8/1972  Miyauchi .............. 174/120 SC X
3,571,613  3/1971  Plate ........................ 174/115 X
3,532,783  10/1970 Pusey et al. ................ 174/70 A
3,429,984  2/1969  Alexander .................... 174/115
3,297,814  1/1967  McClean et al. ................ 174/41
3,267,201  8/1966  Pusey et al. ................... 174/41
2,956,311  10/1960 Raydt et al. ................ 174/41 X Primary Examiner—Bernard A. Gilheany
Assistant Examiner—A. T. Grimley
Attorney, Agent, or Firm—Victor F. Volk

[57] ABSTRACT

An electric cable for service above 2000 volts does not include metallic members in its electrostatic shielding system but depends entirely on a semiconducting polymeric jacket for the electrostatic shield. A parallel neutral grounding conductor, held in lengthwise electrical contact with the jacket, drains any electrostatic current and provides ample path for the return current in the event of a fault.

5 Claims, 3 Drawing Figures

PATENTED FEB 26 1974          3,794,752

HIGH VOLTAGE CABLE SYSTEM FREE FROM METALLIC SHIELDING

BACKGROUND OF THE INVENTION

It has long been known to surround the insulating wall of a high-voltage cable with a metal tape to provide what is known as insulation shielding or electrostatic shielding that maintains a uniform field of electrical stress lines within the insulation. In the absence of such uniformity high concentration of electrical stress at localized points of the insulation would greatly increase the likelihood of insulation failure under load. In recent years, since the introduction of polymeric extrusions as cable insulations it has also become known to apply a thin polymeric semiconducting layer under the shielding tapes to prevent the formation of air pockets between the outer insulation surface and the conducting tapes. It had been found that at high conductor voltages, such as voltages in excess of 2000, such air pockets would ionize and pass corona discharges. Similar semiconducting polymeric extrusions have also been applied directly over the metal conductor, prior to the extrusion of the insulation, to prevent ionization of air pockets at a conductor-insulation interface. In U.S. Pat. No. 3,474,189 Plate et al. substitute metal drain wires for the prior shielding tapes, embedding them in the semiconducting cable jacket, uniformly distributed in the electrostatic field, and in patent 3,571,613 Plate et al. disclosed a two-conductor system including an insulated power conductor having drain wires embedded in a semiconducting cable jacket, in combination with a neutral return conductor. Here again the drain wires are uniformly distributed in the electrostatic field of the power conductor.

The use of shielding tapes and drain wires has always involved a compromise since these elements are required to have sufficient conductance to permit the activation of protective devices in the event of a fault but require very little conductance to drain off the current associated with the electrostatic effects. Additional conductance for conventional shielding systems also adds appreciably to the size and cost of cables. We have now determined that high metal conductance in a cable shield has further serious disadvantages in the event of a fault, inasmuch as the passage of high fault current through the shield can damage or destroy long lengths of the faulted, or even adjacent, cables. We have now found that high metallic shield conductance also creates a likelihood of flashovers of fault currents to ground or to adjacent conductors at points removed along the cable from the primary fault location, with damage occurring at the flash-over points.

In the case of three-conductor cables for use at high voltages, it has been customary to apply metal shields over the insulations of each of the phase conductors. Here the high conductance of metallic shields has the additonal disadvantage that large currents induced in the shields because of their high conductance represent a total power waste and an unwanted generation of heat. Prior to the present invention, however, high conductance of the shields has been considered essential to assure sufficient fault current for operating protective devices.

SUMMARY

Metal shielding systems are expensive and their inclusion, particularly when it requires a separate taping operation, slows down the production rate of cable manufacture. We have now discovered that high drainage conductance is not necessary within the symmetrical electrostatic shielding of a power conductor provided that an ample return conductor is maintained in electrical contact with the electrostatic shielding at substantially all lengthwise points. Our electric cable system comprises a first elongated member comprising a metallic power conductor, a layer of semiconducting polymeric strand shielding directly surrounding the conductor, a heavy wall of electrical insulation directly surrounding the strand shielding layer and a semiconducting jacket of polymeric electrostatic insulation shielding that is free from any continuous lengths of metal directly surrounding this wall and comprising an outer surface defining the outermost portion of this first member. This jacket comprises a uniform, homogeneous thickness between the insulation wall and the jacket surface. Our cable system also comprises a second elongated member comprising a grounded metal neutral conductor comprising, preferably, an area having at least one-third the electrical conductance per unit length of the area of the power conductor. This neutral conductor, which is itself surrounded by a semiconducting polymeric layer that affords moisture and corrosion protection and may be interstranded with the first member, is in substantially continuous lengthwise electrical contact with the outer jacket surface whereby a fault exceeding the current carrying capacity of the jacket will bridge an ionized path to the neutral conductor and be returned to ground.

We have invented an electric cable comprising three elongated helically stranded members each comprising a metallic power conductor, a layer of semiconducting strand shielding directly surrounding the conductor, a heavy wall of electrical insulation directly surrounding the strand shielding layer and a semiconducting jacket of polymeric insulation shielding directly surrounding this wall. This jacket comprises an outer surface defining the outermost portion of the member and it also comprises a uniform, homogeneous thickness between the insulation wall and the jacket surface. Our cable also comprises a metallic neutral conductor, comprising an outer individual semiconducting lay, laid centrally of the members in continuous lengthwise electrical contact with the jacket surfaces, whereby a fault that exceeds the current capacity of the jackets will bridge an ionized path to the neutral conductor and be returned to ground.

BRIEF DESCRIPTION OF DRAWING(S

DETAILED DESCRIPTION OF PREFERRED EMBODIMENTS

Figure 1:
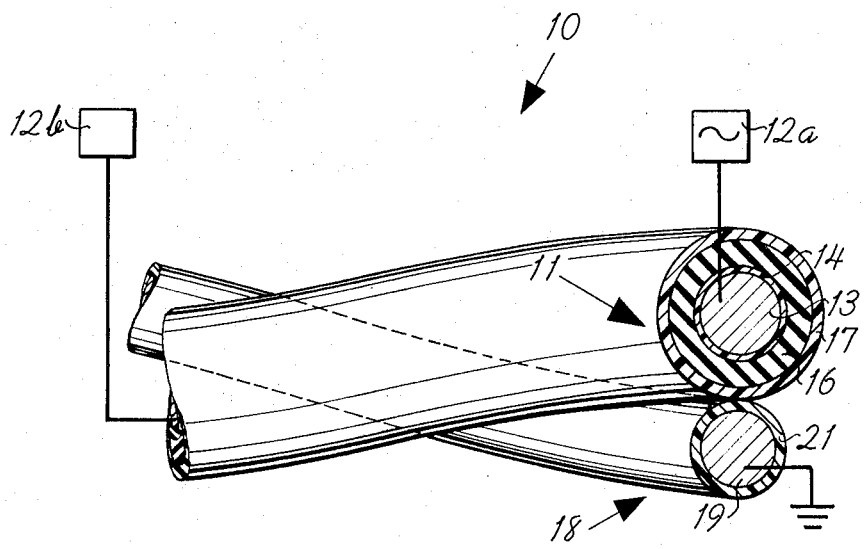
FIG. 1 shows two members of a cable system of our invention.

In FIG. 1 our cable system, indicated generally by the numeral 10, includes a power carrying member 11 for carrying power from a supply such as a generator, transformer, or connecting system 12a, and a load 12b or connecting means thereto. The member 11 comprises a metallic conductor 13 which will typically take the form of a solid or stranded copper or aluminum conductor. The conductor 13 is surrounded by a polymeric semiconducting strand shielding layer 14 which, in turn, is surrounded with a wall 16 of polymeric insulation having a thickness selected according to established standards for the desired cable operating voltage. Both the layer 14 and wall 16 may most conveniently have been applied by extrusion. The wall 16 may comprise a polyolefin such as polyethylene or polypropylene or co- or terpolymers of these and may be thermoplastic or vulcanized. The wall 16 may also comprise polyvinyl chloride so long as the dielectric strength is sufficient at the employed wall thickness for the conductor operating voltage. This voltage will be no less than 2,000 volts, for which insulation shielding is advisable, and where the unit dielectric strength of the polymeric material used is lower, a greater wall thickness will compensate for it. Surrounding the wall 16 of insulation we have extruded a closely applied jacket 17 of semiconducting polymeric composition. The jacket may have the same composition as the layer 14 but, preferably, it will be compounded for greater toughness and for sufficient elongation to absorb repeated thermal expansion and contraction of the wall 16. The semiconducting properties of both the layer 14 and jacket 17 are conveniently obtained by incorporating a conducting carbon black in the composition. For the jacket 17 a preferred composition has been disclosed in application Ser. No. 167,741, assigned to the present assignee, filed July 30, 1971, but a number of suitable semiconducting jacket compositions are known, comprising such polymers among others as neoprene, polyethylene, chlorosulfonated polyethylene, polyvinyl chloride, and ethylene-propylene copolymer. The jackets may be either vulcanized or thermoplastic within the scope of our invention or they may be partially vulcanized, as disclosed in Wade U.S. Pat. No. 3,705,257. The resistance of the jacket 17 per foot length of cable should be in a range of one-tenth ohm to 5,000 megohms, with a jacket thickness of at least 24 mils. Cable geometry determines that resistances within this range can be provided by the usual range of resistivities of semiconducting jacketing compositions of 1 to $10^6$ ohm-cm so long as appreciable lengths of metal are excluded from the jacket. The outer surface of the jacket 17 also comprises the outer surface of the member 11, defining the outermost portion of that member. A second member, indicated generally by the numeral 18, of the system 10 comprises a metal neutral conductor 19 such as copper or aluminum, covered with a protective layer 21 of semiconducting polymeric composition which may comprise the same composition as the jacket 17 and should be at least about 15 mils thick. The conductor 19 may be solid, but, following customary cable practice, it will be formed of a plurality of wirees stranded together if the area is so great that a solid rod would be too rigid. The members 11 and 18 are in physical contact substantially throughout their lengths. To maintain a tangent line of contact between the two members they can be stranded together or duplexed as shown in FIG. 1. It is important, however, that the currents being generated in the jacket 17 should be able to drain into the member 18. Some industry specifications require that the area of a neutral conductor be equivalent to the area of the power conductor. In any event, considering the possibility that the two conductors comprise different metals, the conductance of a unit length of the neutral 19 should be at least one-third of that of the conductor 13 to afford current capacity adequate to insure operation of protective devices under fault conditions.

Figure 2:
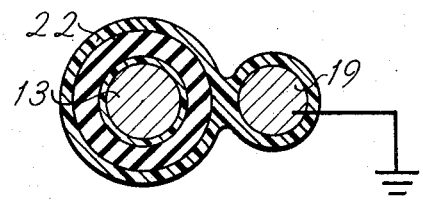
FIG. 2 shows a section of another embodiment of the system of FIG. 1.

In FIG. 2 we have shown the conductors 13 and 19 confined within a single semiconducting jacket 22 of continuous cross-section. This, of course, removes the possibility of high resistance electrical gap forming between the two members, and may constitute an economy in that, in effect, the jacket 17 and the layer 21 can be extruded in a single operation. The jacket 22 may comprise a single, homogeneous composition, but different compositions can also be used for the portion of the jacket that surrounds the insulation 16 and that which covers the metal neutral 19, provided only that the portions are compatible and bond together at their interface. An advantage of dual compositions might reside in the possibility of compounding higher moisture impermeability into the neutral side and greater tolerance for thermal expansion into the insulated conductor side.

The jacket 17 is free from metal and it is essential in our invention that continuous lengths of metal shall not comprise any element of the member 11 external of the wall 16 of insulation. Hence, should a fault occur through the wall 16 the relatively high resistance of the jacket 17 precludes the passage of high currents longitudinally in the jacket. It is recognized that finely divided metals and metallic compounds may be comprised in jacketing compositions that are nevertheless suitable for use in the jacket 17 since each metallic particle is isolated from its neighbors. By "continuous" lengths, we refer herein to lengths of the order of ten mils or greater. Sufficient current does pass through the semiconducting material, however, to bring the outside surface to conductor potential and ionize the surrounding air. The immediate area of the semiconducting jacket 21 is also brought to high potential until a conducting path has been burned to the conductor 19 immediately adjacent its fault. This path remains conducting for the fraction of a second that usually is required for the protective device to interrupt the supply of current to the conductor 13 and the only damage requiring repair will have been damage to the members 11 and 18 in the immediate neighborhood, usually limited to a few inches, of the original fault.

Figure 3:
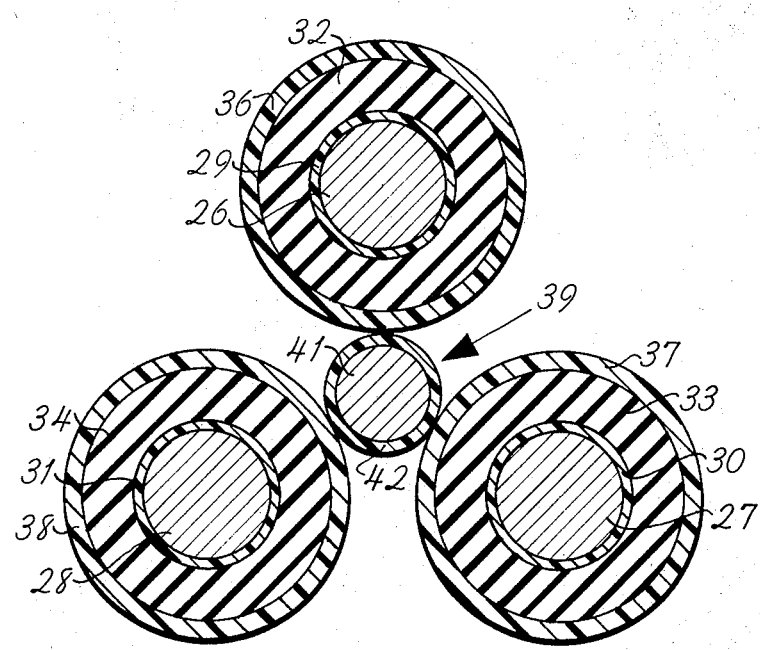
FIG. 3 shows a section of a cable of our invention.

In FIG. 3 our inventive concept is shown embodied in a three-conductor cable. Here conductors 23, 27, 28, respectively, surrounded by semiconducting strand-shielding layers 29, 30, 31, insulation walls 32, 33, 34, and semiconducting jackets 36, 37, 38 are helically stranded together or triplexed around a central member 39. The member 39 comprises a metal conductor 41 comprising a neutral and covered with a semiconducting jacket 42. This neutral 41 should have at least half the conductance per unit length of one of the conductors 26, 27, 28. The member 39 is in physical and electrical contact with jackets 36, 37, 38. Fault currents developing in any of the jackets 36, 37, 38 can flash immediately to the neutral conductors in the maner above described and, indeed, since the three jackets and neutral form a continuous low resistance section, electrostatic currents have all three of the neutral conductors available as return paths. Since, as is essential to eliminate induced eddy currents, the jackets, 36, 37, 38 are free from metal, very little current is induced in the electrostatic shielding system of the cable 23. The neutral 41, being centered, is essentially free from any induced current but serves adequately to return any fault current for the operation of protective devices.

The description hereinabove given has been exemplary rather than definitive of our invention for which we desire an award of letters patent as defined in the following claims.

We claim:
1. An electric cable system comprising,
A a first elongated member comprising,
   a. a metallic power conductor,
   b. a layer of semiconducting polymeric strand shielding directly surrounding said conductor,
   c. a heavy wall of electrical insulation directly surrounding said layer,
   d. a semiconducting jacket of polymeric electrostatic insulation shielding, free from continuous lengths of metal, directly surrounding said wall, said jacket comprisng an outer surface defining the outermost portion of said first member, and said jacket comprising a uniform, homogeneous thickness between said wall and said surface,
B. a second elongated member comprising,
   a. a grounded metal neutral conductor,
   b. a semiconducting jacket of polymeric composition directly surrounding said neutral conductor,
   c. said second member being in substantially continuous lengthwise proximity to said surface whereby a fault through said insulation may bridge an ionized path to said neutral conductor and be returned to ground.

2. The system of claim 1 wherein said first and second members are inter-stranded.

3. The system of claim 1 wherein said semiconducting layers are continuous in section.

4. An electric cable comprising,
A. three elongated members helically stranded together, each of said members comprising,
   a. a metallic power conductor,
   b. a layer of semiconducting strand shielding directly surrounding said conductor,
   c. a heavy wall of electrical insulation directly surrounding said layer, and
   d. a metal free semiconducting jacket of polymeric electrostatic insulation shielding directly surrounding said wall, said jacket comprising an outer surface defining the outermost portion of said member, and said jacket comprising a uniform, homogeneous thickness between said wall and said surface,
B. a metallic neutral conductor laid centrally of said members, and in continuous lengthwise electrical contact with three of said surfaces, whereby a fault exceeding the current carrying capacity of said jackets will bridge an ionized path to said neutral conductor and be returned to ground, said neutral conductor being grounded.

5. The cable of claim 4 comprising a semiconducting jacket of polymeric composition directly surrounding said neutral conductor.

* * * * *